Aug. 24, 1965            J. R. WILEY            3,202,457

RETRACTABLE AND EXTENSIBLE ROOF ASSEMBLY

Filed Jan. 24, 1964            4 Sheets-Sheet 1

INVENTOR

JOHN R. WILEY

BY WILSON, SETTLE & CRAIG
ATTORNEYS

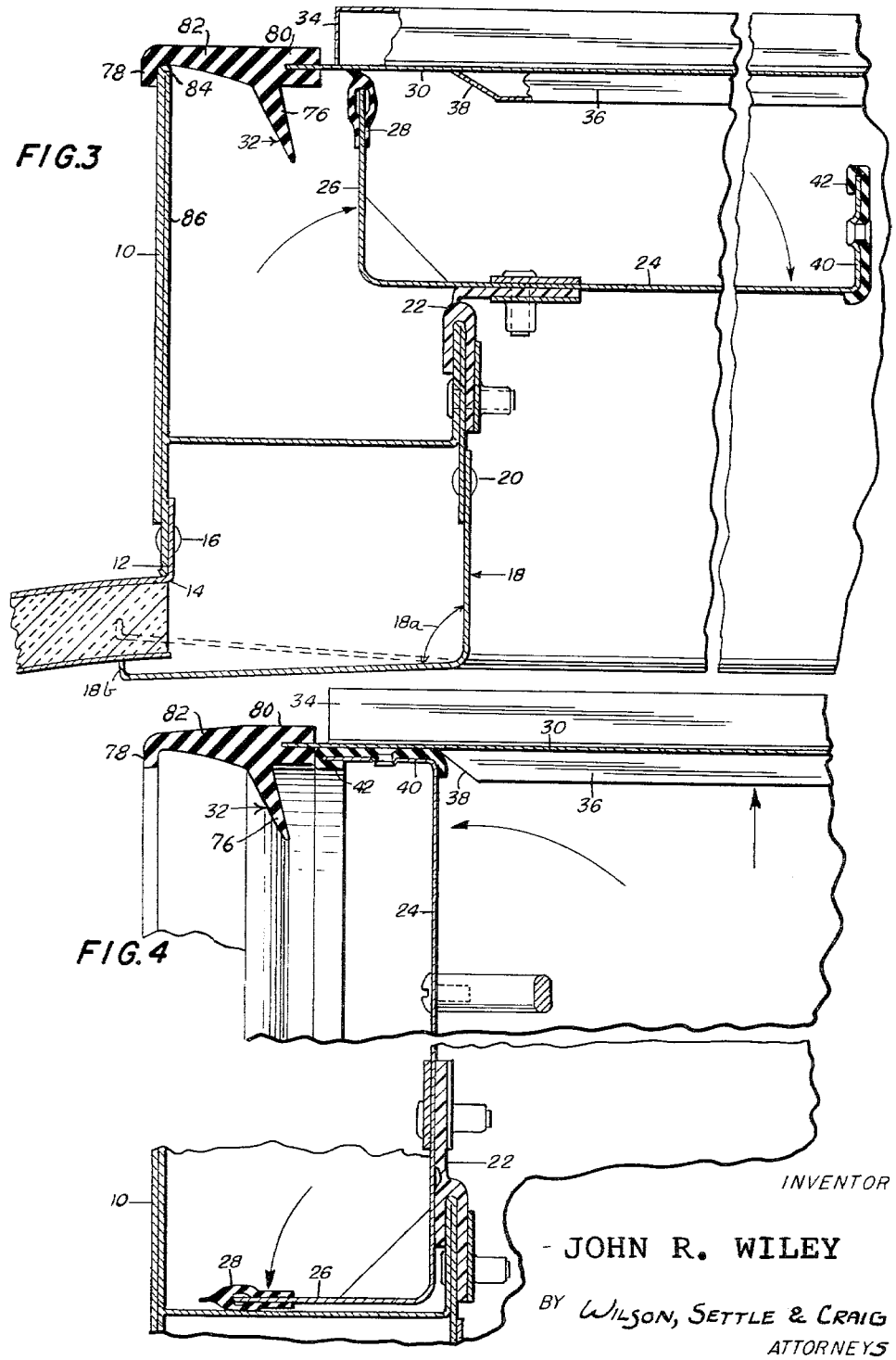

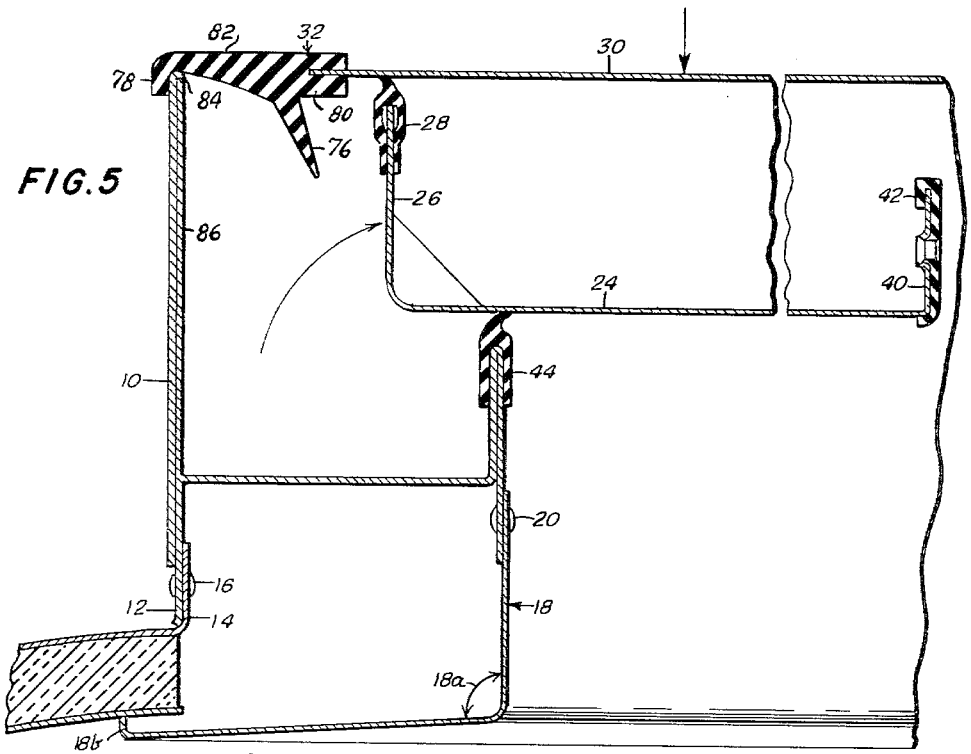
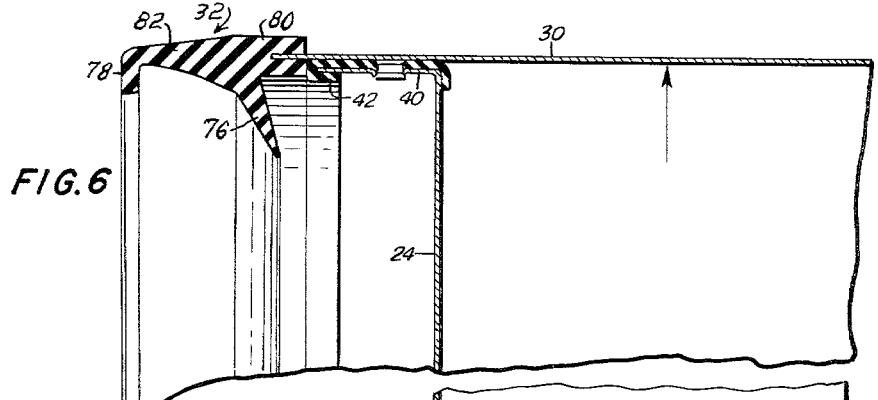
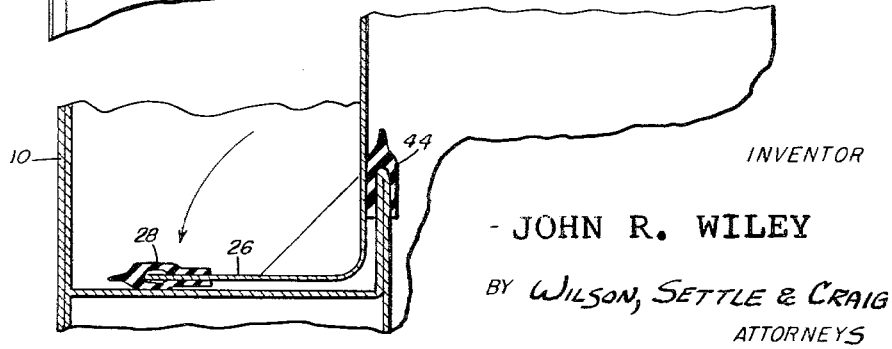

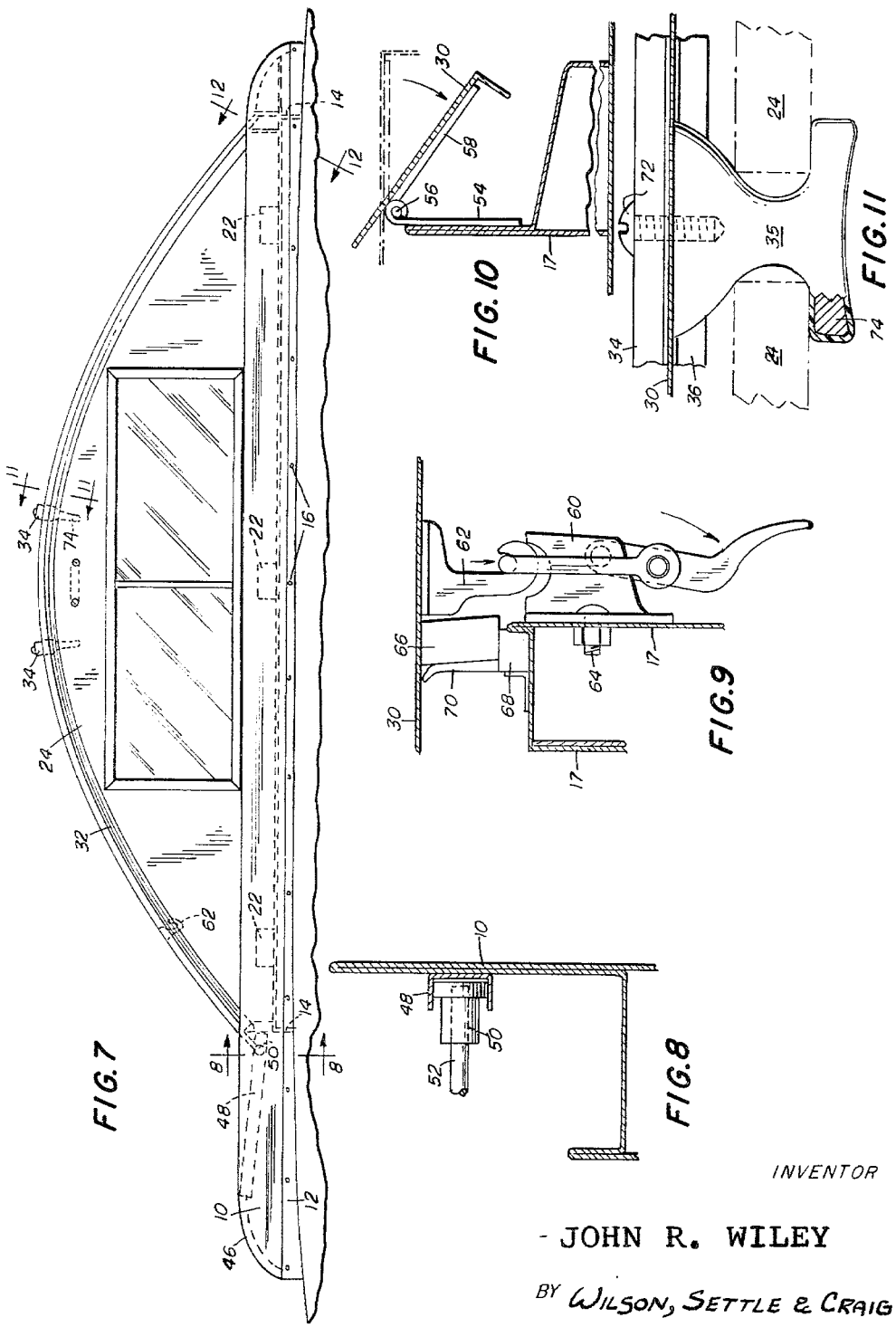

United States Patent Office 3,202,457
Patented Aug. 24, 1965

3,202,457
RETRACTABLE AND EXTENSIBLE ROOF
ASSEMBLY
John R. Wiley, Elkhart, Ind., assignor to Excel Corporation, Elkhart, Ind., a corporation of Indiana
Filed Jan. 24, 1964, Ser. No. 342,330
1 Claim. (Cl. 296—137)

This invention relates to vehicular roof assemblies and particularly to roof assemblies which may be extended and retracted to increase, at will, vehicular head space or head room. More particularly, the invention relates to new and improved extensible and retractable roof assemblies for vehicles which have new and improved design features over those of the prior art. Still more particularly, the invention relates to new and improved weatherproof extensible and retractable vehicular roof structures which are useful for varying vehicular head room.

The concept of extensible and retractable roof assemblies for motor vehicles, trailers, boat super-structures, and the like is known. The prior art has recently taught the concept of a vehicular roof assembly which is so designed to increase head space or head room when the occupants desire; however, the art is still in its infancy and a completely satisfactory roof assembly having the features and characteristics desired as the ultimate is not yet available either commercially or, so far as is known, in the research stage. One patent on a collapsible roof assembly in U.S. Patent No. 2,926,042 issued Feb. 23, 1960, to M. Calthorpe.

The roof assembly concept to which the instant invention is directed inculcates design features which permit the assembly to be retracted during vehicular motion so that a flat low silhouette and the resultant low wind resistance is experienced. At the same time, when vehicular motion is stopped, the assembly may be extended in order to permit ease of movement within the vehicular area because of the increased head room. Generally the extended roof assembly presents an arcuate roof line with the center or chord of the arch at the middle of the assembly and with the arcuate roof portion being supported by side panels which are also arcuate along the top edge thereof, said arcuate edges maintaining line contact with the roof in its extended position. The arcuate side panels are hingedly secured so as to retract by rotating inwardly and the roof portion, which is of a flexible material, is allowed to lower and lock in the general plane of the vehicular roof.

It will be appreciated that such a roof assembly, in order to be acceptable, must be of such design to keep out the wind and rain since it normally forms a part of weather tight vehicular structure. It will also be appreciated that the problems of weatherproofing such a movable structure are difficult and a great deal of attention has been given to these problems.

The instant invention is directed toward a roof assembly that is extensible and retractable and which includes new and novel features of design and structure which make it substantially completely waterproof both in its extended and retracted position.

Briefly the roof assembly of the instant invention comprises a frame, a flexible roof, two arcuate side panels rotatably attached to said frame, and an adjusting member attached to said frame which allows the assembly to be fitted to vehicular roof surfaces of different shapes and slopes. The roof, which is of a flexible material, is pivotally attached at the rear end thereof to said frame and slidably attached to the frame at the forward or front end thereof.

The roof assembly of the invention is normally mounted on a vehicular roof which has a rectangular opening therein of a size just slightly smaller than the outline of the frame of the assembly. The frame is permanently affixed to the vehicular roof by means hereinafter described and the juncture between the assembly and the vehicular roof is covered by a garnish or "surround" to present an esthetic appearance thereto. The assembly of the invention is so designed that when the side panels are retracted and the roof member assumes the plane of the vehicular roof, it is locked in this position and a low flat silhouette is presented for vehicular motion. The improved design to be described more in detail below renders the assembly substantially completely waterproof in this retracted position as well as when extended.

As has been mentioned above, one of the problems with the extendable tops of the prior art has been that of the sealing means employed to weatherproof the assembly, particularly when the vehicle is moving. One of the features of the improved extendable top of the instant invention is the sealing means employed to solve the weatherproofing problems which have presented themselves to the art.

Generally speaking, the improved assembly to which this invention is directed comprises a rectangular frame which is supported directly by a vehicular roof, a flexible top which is slidably fastened to the frame at the front end thereof and rotatably fastened to the frame at the rear end thereof, and two side panels, arcuate in shape, which are rotatably fastened to the sides of said rectangular frame. When extended, the side panels are in vertical relation to the plane of the frame and the flexible top is positioned along the arcuate edges of the side panels forming a curved roof line when viewed from a side. When retracted, or lowered, the side panels rotate inwardly about their point of attachment to the frame until they lie in a plane parallel to the frame and the top retracts downwardly, the rear end rotating about its point of attachment to the frame and the front end slidably adjusting at its point of slidable attachment until the complete top is resting in a plane which is also parallel to the rectangular frame and is making contact with an angled portion of each of the side panels.

The invention concept will be more clearly explained by reference to the drawings in which:

FIG. 3 is a section taken along the line 3—3 of FIG. 1;

FIG. 4 is a section taken along the line 4—4 of FIG. 2;

FIG. 5 is a section taken along the line 5—5 of FIG. 1;

FIG. 6 is a section taken along the line 6—6 of FIG. 2;

FIG. 7 is a side elevation showing the top of the invention in its raised or extended position;

FIG. 8 is a section taken along the line 8—8 of FIG. 7;

FIG. 9 is a side view of the locking assembly which locks the top in position in its retracted attitude;

FIG. 10 is a cross-sectional view of the hinge means by which the roof portion is attached to the frame member in the rear of the assembly;

FIG. 11 is a section taken along the line 11—11 of FIG. 7; and

The frame, which is ordinarily rectangular in shape and slightly larger than the opening in the vehicular roof, comprises, on the long sides thereof, a rolled H-beam 10, and an adjusting strip 12 by means of which the frame may be adjusted to any vehicular roof pitch or angle. The H-beam member is formed by a rolling or stamping process from one sheet of material and has an inside and outside upper and lower flange. The top member 14 of the vehicular roof is rolled upwardly and outwardly and is permanently affixed to adjusting strip 12 by means of rivets 16. An elastomeric sealing compound is normally placed between roof member 14 and adjusting strip 12 prior to rivetting, thus assuring a completely weatherproof juncture at this critical point of attachment.

Figure 12:
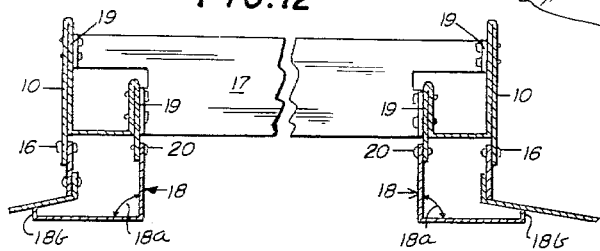
FIG. 12 is a partial section taken along the line 12—12 of FIG. 7.

The short sides of the frame, that is the front and rear sides thereof, comprise a cross member 17 which is adapted to be permanently affixed to said H-beam members 10 which comprise the long sides of the frame. The point of attachment to the H-beam is shown at 19 of FIG. 12 and may be accomplished by spot-welding, rivetting, etc. The cross member is affixed to both upper flanges of the H-beam member, and thus the side H-beam members with the two cross members form a rigid rectangular frame for the assembly of the invention.

A garnish member, or "surround," which comprises an angled sheet of material, is applied to the inside surface of the vehicular roof and to the inside lower flange of the H-beam member. This garnish, shown at 18, is fixedly secured to the inside bottom flange of the H-beam by rivet 20 and is of such a design that the angle at 18a is increased upon installation, thus holding the end 18b tightly against the vehicular roof. The tension exerted by this design thus prevents any chatter, or rubbing and adds to the tightness of the assembly. The garnish serves to present a pleasing appearance from the inside of the vehicle and presents a mounting surface for accessories such as lights, fans, etc.

Rotatably secured to the top inner flange of the H-beam by means of plastic hinges, shown at 22, is side panel 24. Detail of the side panel is shown in the lowered position in FIGS. 3 and 5 and its raised position in FIGS. 4 and 6. It will be noted that the bottom portion of side panel 24, or portion 26, is fashioned at a right angle to the main section of the side panel 24 and in its lowered or retracted position, as shown in FIGS. 3 and 5 forms a support for the roof assembly, the point of support comprising an elastomeric sealing strip shown at 28 which forms a weatherproof seal with the roof portion when in contact therewith. When the side panels are in raised or elevated position, sealing strip 28 forms a weatherproof seal with the middle section of the H-beam as shown in FIGS. 4 and 6. Sealing strip 28 is of an extruded or molded plastic material and is of a U-shaped cross-section having an upwardly extending flexible tip. This strip forms a weather-tight seal along the length of the H-beam.

The improved travel-top assembly of this invention has as another outstanding feature the unique roof design which is shown in cross-section in FIGS. 3 through 6. Basically, the roof comprises a sheet of flexible material illustrated at 30. Its width is sufficient to bring its edges at approximately the middle of the H-beam of the side frame members. Its edges terminate in an elastomeric weather strip of unique design. This weather stripping, or sealant strip, shown at 32, comprises a strip of extruded plastic material which is designed with a downwardly and inwardly inclining lip or tongue 76 and with a tip portion 78 which curves downwardly of an angle of at least 90° with the horizontal. Viewed in cross section this weather stripping has a rectangular base section 80 which contains a slot which receives the edge of the flexible roof member 30. The top, or lateral, section 82 of the weather strip is frustro-triangular in cross-section with the top portion bent in a smooth curve to an angle of at least 90° to form the continuous outer tip 78. The downwardly and inwardly inclining lip or tongue portion 76 is formed at the point of conjunction of the rectangular base portion 80 and the base of the frustro-triangular section 82 of the strip. It is to be appreciated that this unique design is accomplished by an extrusion moulding technique and that the strip comprises one piece of plastic material which is cut to the desired length.

This weather strip is adhesively attached to roof member 30. When the roof is in its lowered position, as shown in FIGS. 3 and 5, the unique design of the strip—particularly the downwardly and inwardly inclining lip or tongue 76—prevents wind and rain from penetrating the seal between roof member 30 and sealant strip 28 or angle 26 of side member 24. The curled tip member 78 in this position, also engages the top 84 of the outer flange 86 of H-beam member 10 and forms a weather tight seal to prevent precipitation from accumulating in the H-beam member. When the roof is at its elevated or raised position and side member 24 is in vertical relation (FIGS. 4 and 6), sealing strip 32 again serves as an integral portion of a sealing contact, to be further described below, and also the down-turned tip portion 78 and the downwardly and inwardly inclining lip or tongue 76 serves to deflect wind and rain from directly attacking the point of contact between the roof member 30 and the arcuate side panels.

It is to be recognized, of course, that the cross-sectional configuration of the weather strip member 32 may be varied as desired. For example the strip could be triangular in cross-section, frustro-triangular, rectangular, etc., so long as the tip section thereof is bent to the proper configuration and the downwardly and inwardly inclining lip or tongue is properly positioned.

Roofing member 30, on the upper portion thereof and at two or more equally spaced locations, has fastened thereto support members 34. These support members are shown as hollow channels in the drawings but may be of any configuration which gives the desired support. Cleat members 35 extend through these support members 34 and roof member 30 and are more completely described below.

On the inner surface of roof member 30 there is positioned a series of parallel ribs which extend across the inner surface of roof 30. These rib members may be imbossed directly from the material of the roof by drawing, etc. or they may be constructed separately and affixed to the roof member 30 by spot-welding and the like. The rib members serve several useful purposes. They add strength to the roof member 30. They form sliding surfaces for support of the roof by the arcuate portion of the side panels during the roof raising or elevating operation and thus prevent marring or scratching of the under surface of roof member 30. The point of their termination toward the edge of roof member 30 forms a locking situation for maintenance of side panels in vertical relation. One such rib member is shown at 36 with the angular end portion shown at 38 in FIGS. 3 and 4.

As was mentioned above, the weatherproofing of the juncture of the roof and side panels, both when in raised or lowered position, is an important feature of the improved assembly of this invention. When in lowered or retracted position, the H-beam construction of the side frame members in conjunction with the sealing strip 28 on the bottom of side panels 24 and with sealing strip 32 on the edges of the roof forms a substantially completely weatherproof juncture and in addition completely seals the H-beam opening. When side panel 24 is in the elevated position, the seal between roof member 30 and the top of the side panel is extremely important and is shown in detail in FIGS. 4 and 6. Side panel 24 terminates at its top portion in an outwardly extending right angled bend shown at 40. This angular portion is covered by a sealing strip 42 which extends completely over the outer surface of angular bend 40 and is attached thereto. This sealing strip is prepared from a plastic material which has a waxy, smooth surface with a low co-efficient of friction so that it will slide easily when in contact with rib members 36 during extending and retracting operations. When side member 24 is elevated to be placed in its vertical position, roof member 30 is raised by the angular action of the arcuate portion of side panel 24, sealing strip 42 being in direct contact with rib members 36. In this vertical position sealing strip 42 makes contact with sealing strip 32 and is held in contact by the locking situation afforded by the ends 38 of rib member 36 and angle 40. The combination of the contact between sealing strip 42 and roof member 30 together with the sheltering action of the tongue or lip of sealing strip 32, insures a completely water-proof seal between the roof and the elevated side panel of the assembly of the instant invention.

Figure 1:
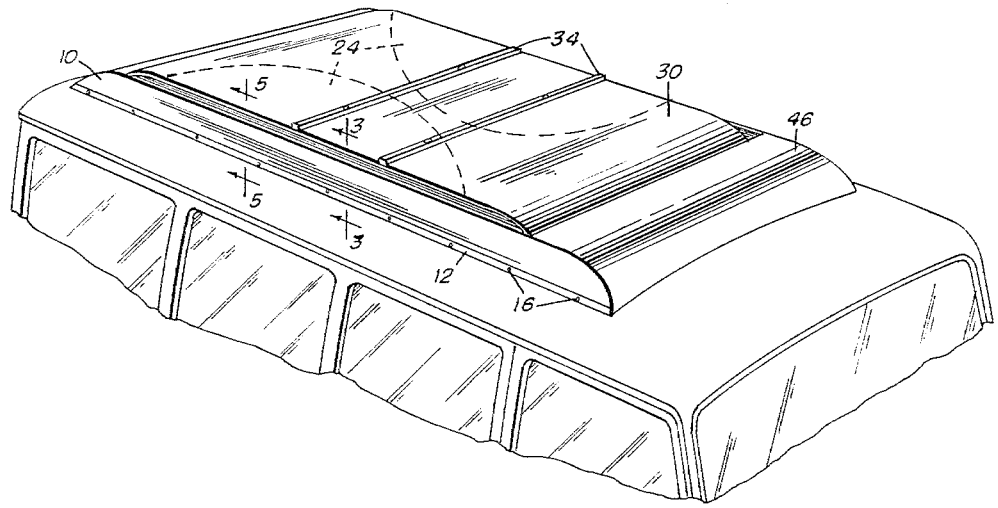
FIG. 1 represents a perspective view of the retractable and extensible top of the invention in its lowered position.
Figure 2:
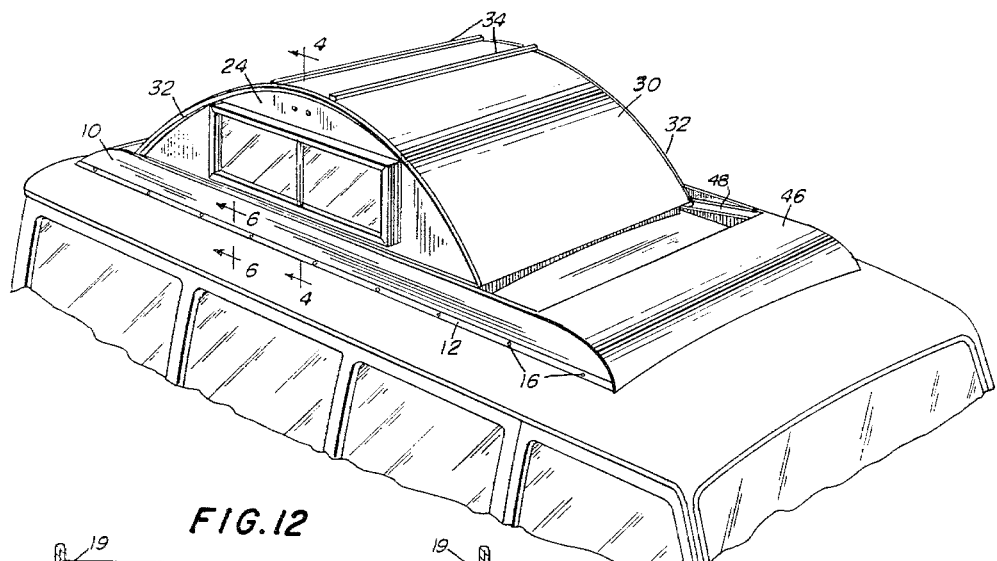
FIG. 2 is a perspective view of the top in its raised position.

Between the hinge members, side weatherproofing is accomplished by sealing strips 44 as is shown in FIG. 5 and FIG. 6, which are cross-sectional views taken along the lines 5—5 of FIG. 1 and 6—6 of FIG. 2 respectively. When side panel 24 is in its retracted position contact is made between sealing strip 44 and the side panels so as to insure that no wind or moisture penetrates the interior. Sealing strip 44 is similar in shape and is of the same dimensions as sealing strip 28 and when adhered securely to the shorter inside flange of the H-beam it surrounds a double thickness and thus no bulging of the sides is experienced.

At the front end of the top assembly there appears cover plate 46. Beneath this cover plate and affixed to each side frame member is channel member 48 which is adapted to receive nylon rollers 50 which are fitted to the ends of cross rod 52. Rod 52 is permanently affixed to roof 30 and the assembly comprises the slidable attachment referred to above which attaches roof member 30 to the frame assembly. The position of roller member 50 in channel member 48 when the roof is in the elevated position is shown in phantom in FIG. 7. As the roof is retracted roller member 50 slides forward and upward to accommodate the roller member 50 in the completely retracted position of the roof as shown in FIG. 1.

The pivotal attachment of the rear end of roof member 30 to the frame member is shown in FIG. 10. Hinge member 54 is attached to rear cross member 17 by rivetting, welding, or other fastening means. Pivoting pin 56 which is attached to pin plate 58 which in turn is securely affixed to roof member 30 pivots within hinge member 54 as the roof is elevated and retracted. FIG. 10 shows these details with the solid line representing the elevated position and the dotted lines showing the retracted or lowered position.

When in the lowered or retracted position, roof 30 is held in horizontal relation by means of eccentric lock assembly 60, cooperating in known fashion with locking attachment 62. The lock assembly 60 is attached to the front cross member 17 by means of fastening device 64. Weatherproofing at this juncture is provided by means of sealing strip 68 which includes an integral projection shown at 70. Sealant strip 68 is permanently affixed to the top of cross member 17 and projection 70 makes line contact with roof member 30 the width of the roof. At each end of cross member 17 there is attached a sponge rubber block 66 to make weatherproof contact with sealing strip 28 of side panel 24 and sealing strip 32 of roof member 30.

When in its retracted or lowered position roof 30 is supported at the rear thereof by the hinge means shown in FIG. 10, at the front end thereof by means of the slidable fastening means shown in FIG. 8 and along the sides thereof by the angular portion 26 of side members 24, direct contact being made with sealing strip 28. It is locked in this position by the lock assembly shown in FIG. 9. The side members 24, when lowered, are held in horizontal position by means of cleats 35. These cleats members are attached through roof member 30 and rib members 34 by means of screws as shown at 72 of FIG. 11. Cleat member 35 is preferably of metal and covered with a vinyl covering as is shown at 74. As the roof is retracted and side panel members are rotating inwardly about hinge members 22 they are firmly held by the conformation of cleat 34 as shown in FIG. 11. Thus any possibility of vibration or rattling is removed when the roof is locked in its retracted position.

To summarize briefly the instant invention is an improved extensible and retractable roof assembly which is completely weatherproof and which, because of its unique construction and many novel features, represents an advance over the existing art. It comprises a frame, a flexible roof which is pivotly attached at the rear thereof to said frame and slidably attached to said frame at the front end, arcuate side panels which are rotatably attached to side frame members, and an adjusting member which is atached to the underside of said frame member and which allows the assembly to be adapted to roof surfaces of different shapes and slopes.

The frame member comprises a novel H-beam construction in which the side frame members are fixedly attached to said cross frame members. The H-beam is constructed of one piece of material and has a longer outside flange and a shorter inside flange. The side panel members are constructed so that the bottom and top portions thereof are turned outwardly at a right angle and the outside edge of the bottom angled portion is covered with a sealing strip of extruded plastic having a flexible tip thereon. The outside edge and end of the top angled portion of the side assembly is also covered with a plastic sealing strip. The inside upper flange of the side frame assembly is covered with a plastic strip having a flexible tip thereto which is similar to the one covering the outside edge of the bottom angled portion of the side panel. The side arcuate panels are rotatably secured to the inside upper flange of the side frame assembly by means of plastic hinges. The outside edge of the flexible roof assembly is covered by an extruded plastic strip of an unique design which comprises a strip having a rectangular base section and a frustro-triangular top section with the tip being bent downwardly at an angle of at least 90° with the vertical axis of the strip and having a downwardly and inwardly inclining lip or tongue.

When in either the raised or lowered position there is complete and intimate contact between the side panels and the roof assembly through the medium of extruded plastic weather-stripping and the assembly thus affords complete and unique weatherproofing.

What is claimed is:

In an extensible and retractable weatherproof top assembly comprising a frame having side members of H-beam construction with the outer wall thereof extending upwardly, front and rear cross members rigidly affixed at the ends of the said side members, a flexible top of a sheet of pliable material, said top being pivotally attached at one end to said frame and slidably attached at the other end to said frame, said top being movable to a raised position and a lowered position, a pair of arcuate side panels pivotally attached and sealed at one edge to said frame, said side panels being pivotal to a raised position wherein the free edges thereof form a sealed juncture with the top, said side panels being pivotal to a lowered position, an extension on the pivotally attached edges of the side panels, said extension forming a sealed juncture with the top when the panels are in a lowered position, the improvement comprising a flexible weatherstrip fitted on each side edge of said top and extending the length thereof, each of said side edges of the top being spaced from the outer walls of the adjacent H-beam side members, each of said weatherstrips extending through and over the space between the respective side edges of the top and adjacent H-beam side member, an integrally formed tip on the outer edge of each weatherstrip extending the length thereof, said tips being bent downwardly at an angle of at least 90° with the horizontal, said tips sealingly engaging the upper edges of the outer walls of the H-beam side members when the top is in the lowered position thus serving as a seal for the H-beam and as a double seal for the juncture of the top and said side panel extensions and for the pivotally attached edge of the side panel and frame, said tips serving as deflectors when the top is in the raised position to shield the juncture of the top and free edges of the side panels.

References Cited by the Examiner

UNITED STATES PATENTS

| | | | |
|---|---|---|---|
| 2,926,042 | 2/60 | Calthorpe | 296—137 |
| 3,061,131 | 10/62 | Robinson | 215—41 |
| 3,134,198 | 5/64 | Calthorpe | 296—137 X |

A. HARRY LEVY, *Primary Examiner.*